(12) United States Patent
Black et al.

(10) Patent No.: US 11,445,269 B2
(45) Date of Patent: Sep. 13, 2022

(54) CONTEXT SENSITIVE ADS

(71) Applicant: Sony Interactive Entertainment Inc., Tokyo (JP)

(72) Inventors: Glenn Black, San Mateo, CA (US); Michael Taylor, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/871,437

(22) Filed: May 11, 2020

(65) Prior Publication Data
US 2021/0352379 A1    Nov. 11, 2021

(51) Int. Cl.
*H04N 21/81*    (2011.01)
*H04N 21/4223*    (2011.01)
*H04N 21/422*    (2011.01)
*H04N 21/488*    (2011.01)

(52) U.S. Cl.
CPC ....... *H04N 21/812* (2013.01); *H04N 21/4223* (2013.01); *H04N 21/42203* (2013.01); *H04N 21/4884* (2013.01)

(58) Field of Classification Search
CPC ............. H04N 21/812; H04N 21/4884; H04N 21/42203; H04N 21/3224
See application file for complete search history.

(56) References Cited

U.S. PATENT DOCUMENTS

| | | | | |
|---|---|---|---|---|
| 5,493,622 A * | 2/1996 | Tsuchino | ................ | H04N 1/407 348/E5.088 |
| 8,138,930 B1 * | 3/2012 | Heath | .................... | G01W 1/00 340/601 |
| 9,071,867 B1 * | 6/2015 | Ray | .................... | H04N 21/4223 |
| 10,171,877 B1 * | 1/2019 | Shah | .................... | H04N 21/812 |
| 10,645,294 B1 * | 5/2020 | Manzari | ........... | H04N 5/232945 |
| 2002/0062481 A1 * | 5/2002 | Slaney | .................. | H04N 5/445 725/42 |
| 2003/0112927 A1 * | 6/2003 | Brown | .................. | H04M 15/41 379/67.1 |
| 2004/0252979 A1 * | 12/2004 | Momosaki | ............... | H04N 5/60 386/244 |
| 2006/0044479 A1 * | 3/2006 | Heo | ........................ | H04N 5/445 348/738 |
| 2007/0073585 A1 * | 3/2007 | Apple | ................ | G06Q 30/0247 705/14.46 |
| 2008/0229353 A1 * | 9/2008 | Morris | ............... | H04N 7/17318 725/32 |
| 2009/0029721 A1 * | 1/2009 | Doraswamy | .......... | H04W 4/029 455/456.3 |
| 2009/0172723 A1 * | 7/2009 | Shkedi | ..................... | H04N 5/76 725/32 |

(Continued)

OTHER PUBLICATIONS

International Search Report and Written Opinion dated Jun. 25, 2021, from the counterpart PCT application PCT/US21/031711.

*Primary Examiner* — Jefferey F Harold
*Assistant Examiner* — Timothy R Newlin
(74) *Attorney, Agent, or Firm* — John L. Rogitz

(57) ABSTRACT

Advertisements are tailored not only to a person's profile but also to the context in which the person finds himself. Thus, for example a video-based advertisement may be reformatted or reprovisioned in audio format when the person is driving, while an audio-based advertisement may be reformatted or reprovisioned to video format in noisy conditions.

19 Claims, 5 Drawing Sheets

(56) References Cited

U.S. PATENT DOCUMENTS

| | | | | |
|---|---|---|---|---|
| 2010/0036717 A1* | 2/2010 | Trest | ............... | G06Q 30/0266 |
| | | | | 705/14.1 |
| 2010/0157151 A1* | 6/2010 | Lee | ............... | H04N 21/4341 |
| | | | | 348/E7.001 |
| 2010/0211446 A1* | 8/2010 | Ray | ............... | G06Q 30/0264 |
| | | | | 705/14.19 |
| 2012/0143662 A1* | 6/2012 | Heath | ............... | G01W 1/00 |
| | | | | 705/14.5 |
| 2012/0304206 A1* | 11/2012 | Roberts | ............... | H04H 60/33 |
| | | | | 725/12 |
| 2013/0036011 A1* | 2/2013 | Roberts | ............... | H04N 21/44218 |
| | | | | 705/14.58 |
| 2015/0098687 A1* | 4/2015 | Sabripour | ............... | H04N 7/181 |
| | | | | 386/227 |
| 2015/0124102 A1* | 5/2015 | Frost | ............... | H04N 5/33 |
| | | | | 348/165 |
| 2016/0029016 A1* | 1/2016 | Yoo | ............... | H04N 5/445 |
| | | | | 348/180 |
| 2017/0103691 A1* | 4/2017 | Hoffman | ............... | G09G 3/2003 |
| 2017/0134806 A1* | 5/2017 | Scavo | ............... | H04N 21/25891 |
| 2017/0364752 A1* | 12/2017 | Zhou | ............... | H04R 1/326 |
| 2018/0061276 A1* | 3/2018 | Baca | ............... | G10L 15/22 |
| 2018/0288380 A1* | 10/2018 | Raffa | ............... | G10L 25/78 |
| 2019/0065449 A1* | 2/2019 | Lee | ............... | G06F 40/111 |
| 2019/0104331 A1* | 4/2019 | Bapna | ............... | H04N 21/23418 |
| 2019/0138261 A1* | 5/2019 | Kawano | ............... | G06F 40/58 |
| 2019/0188756 A1* | 6/2019 | Bradley | ............... | G06V 40/16 |
| 2021/0151082 A1* | 5/2021 | Wang | ............... | H04N 21/234336 |

\* cited by examiner

CONTEXT SENSITIVE ADS

FIELD

The present application relates to technically inventive, non-routine solutions that are necessarily rooted in computer technology and that produce concrete technical improvements.

BACKGROUND

As understood herein, the context in which a person finds himself when presented with advertisements may preclude the person from fully consuming the advertisement.

SUMMARY

Context is detected around media consumption for more intelligent advertising. For example, if a person is watching a video while driving, ads that rely heavily on visuals are not played in favor of ads that rely more on audio. As another example, if a device audio is muted or loud ambient background noise is detected, ads that rely on audio are avoided in favor of visual ads.

A neural network may be used to infer context from sensor signals, such as signals from one or more cameras such as a fisheye camera, from one or more microphones, one or more inertial measurement units (IMU), user interactions with a touch screen, device location as sensed by, e.g., global positioning satellite (GPS), user device speaker volume, and keywords in sensed conversation. The ads to be presented are matched to the inferred context using machine learning analysis. In this way, the playback mode of ads can be targeted to signals from available sensors. Ads may be translated into different formats in real time based on user context. For instance, when audio playback is contraindicated, subtitles such as closed captioning may appear on a video screen along with the video portion of an ad. Text input, eye tracking, voice recognition, and motion detectors all may be used to select an advertisement based on sensed emotion of the user.

Accordingly, an apparatus includes at least one processor programmed with instructions which are executable by the at least one processor to receive signals from at least one sensor associated with a user device. The instructions are executable to, based at least in part on the signals, identify a context, and based on the context being audio, play an audio advertisement on at least one speaker of the user device. The instructions are further executable to, based on the context being visual, play a visual advertisement on at least one video display of the user device.

In some examples the instructions can be executable to, based on the context being visual, present on the display text representing audio in the ad. The text may be derived from audio recognition executed on the ad. In such examples the instructions may be executable to, based on the context being visual, automatically enable closed captioning presentation on the user device.

In non-limiting implementations the instructions are executable to, based on the context being audio, present a modified advertisement of an original advertisement on at least one display of the user device, with the modified advertisement having less visual information than the original ad.

The sensor may include one or more of a location sensor, a microphone, a camera, an inertial measurement unit (IMU).

In example embodiments the instructions may be executable to select an advertisement from a first source of ads responsive to the context being audio and select an advertisement from a second source of ads responsive to the context being visual.

In some embodiments the instructions may be executable to execute image recognition on a first ad, use the image recognition to generate audio based on terms derived from the image recognition, and use the audio to generate an audio version of the first advertisement to be presented when the context is audio.

In another aspect, an assembly includes a processor programmed with instructions executable to configure the processor to infer a user context based on signals from at least one sensor. The instructions are executable to, responsive to a first user context, present an advertisement in a first format, and responsive to a second user context, present an advertisement in a second format.

In another aspect, a method includes identifying a context of user activity, selecting an advertisement based at least in part on the context, and presenting the advertisement on a user device.

The details of the present application, both as to its structure and operation, can be best understood in reference to the accompanying drawings, in which like reference numerals refer to like parts, and in which:

DETAILED DESCRIPTION

Figure 1:
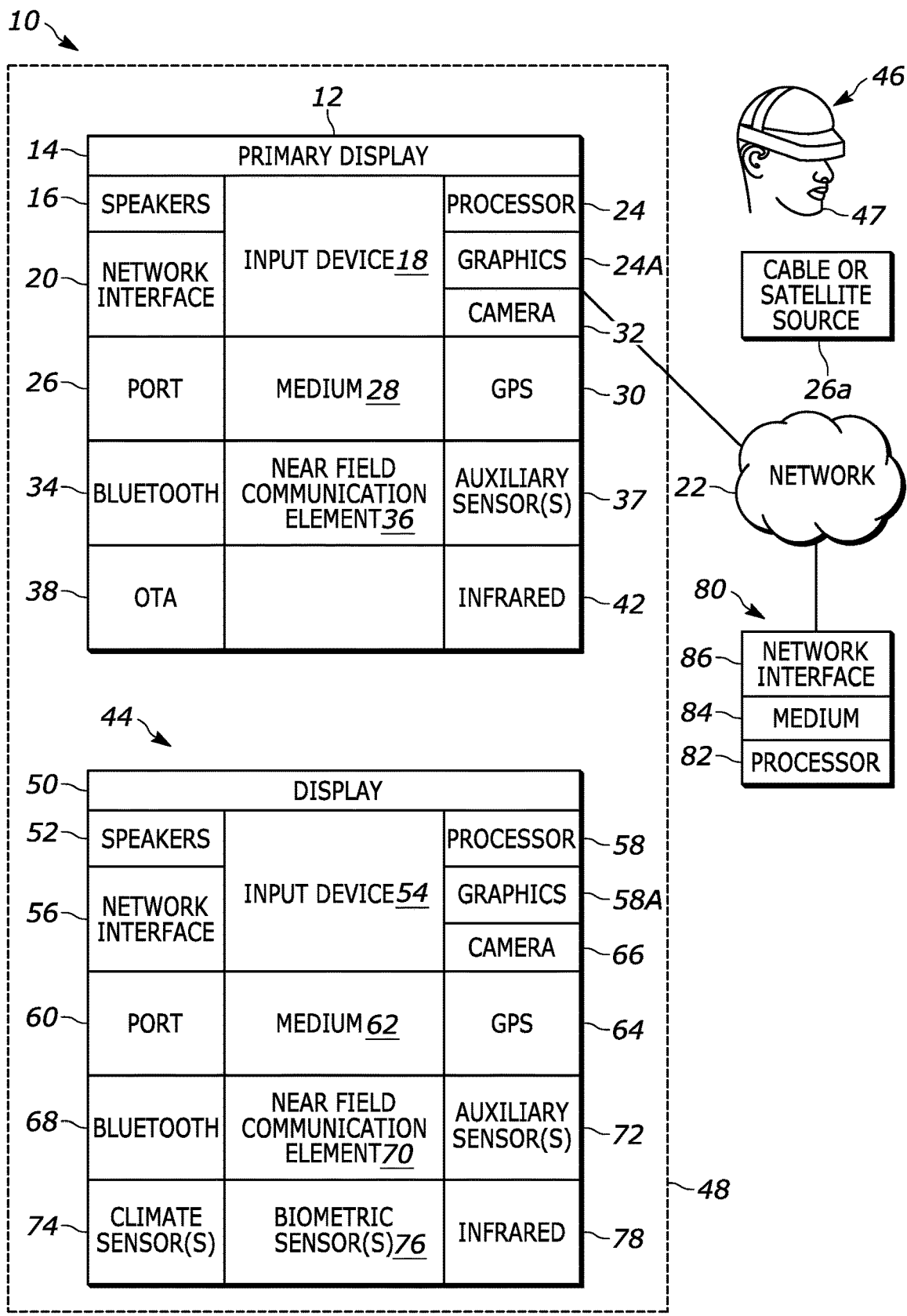
FIG. 1 is a block diagram of an example system consistent with present principles.

This disclosure relates generally to computer ecosystems including aspects of consumer electronics (CE) device networks such as but not limited to computer game networks. A system herein may include server and client components, connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hardwired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24 including. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignment purposes described further below. The source 26a when implemented as a game console may include some or all of the components described below in relation to the CE device 44.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media. Also, in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as a VR headset worn by a player 47 as shown. In the example shown, only two CE devices 44, 46 are shown, it being understood that fewer or greater devices may be used.

In the example shown, to illustrate present principles all three devices 12, 44, 46 are assumed to be members of an entertainment network in, e.g., a home, or at least to be present in proximity to each other in a location such as a house. However, present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller (also referred to as "console"), and accordingly may have one or more of the components described below. The first CE device 44 may be a remote control (RC) for, e.g., issuing AV play and pause commands to the AVD 12, or it may be a more sophisticated device such as a tablet computer, a game controller communicating via wired or wireless link with the AVD 12, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. A graphics processor 58A may also be included. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid-state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server or an entire server "farm" and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

The methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

Figure 2:
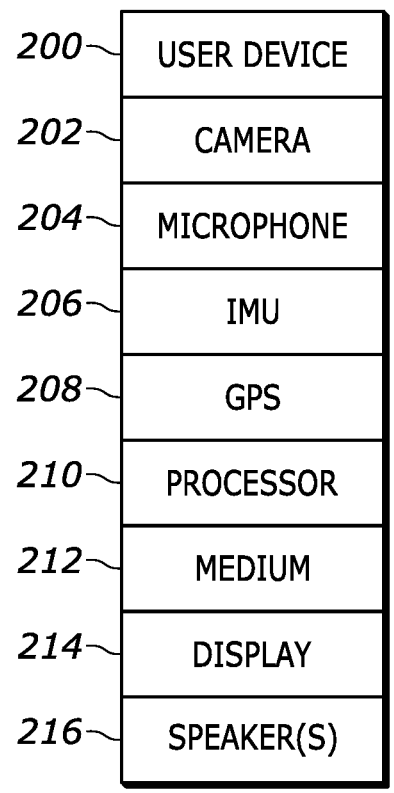
FIG. 2 illustrates an example user device.

Refer now to FIG. 2, which illustrates a user device 200 that may be implemented by any appropriate device described herein and that may include one or more sensors including one or more cameras 202 such as a fisheye camera, one or more microphones 204, one or more inertial measurement units (IMU) 206, and one or more location sensors such as a global positioning satellite (GPS) receiver 208. The user device 200 also may include one or more processors 201 accessing instructions on one or more computer storage media 212 to execute logic described herein to present advertisements on one or more video displays 214 and/or one or more speakers 216.

Figure 3:
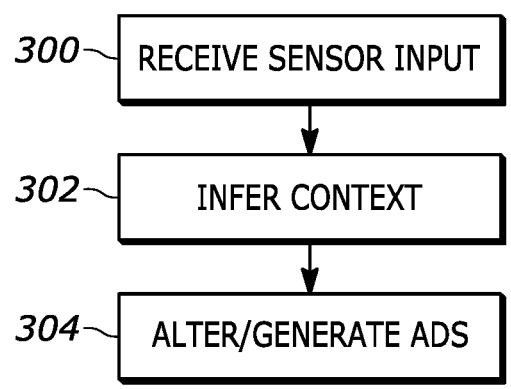
FIG. 3 illustrates example logic in example flow chart format consistent with present principles.

FIG. 3 illustrates overall logic that may be executed by the processor 210 in FIG. 2 or other processor herein. Commencing at block 300, the processor receives signals from one or more of the sensors described herein, such as any one or more of the sensors shown in FIG. 2. Moving to block 302, the activity context of the user is inferred based on the signals. This inference may be identified using a machine learning algorithm such as a neural network (NN) described elsewhere herein. Based on the activity context of the user, at block 304 an advertisement is presented in primarily or exclusively video format or in primarily or exclusively audio format by, e.g., generating a context-based ad on the fly from a standard ad, or accessing one of plural ad databases that are divided or sorted by context, etc.

Figure 4:
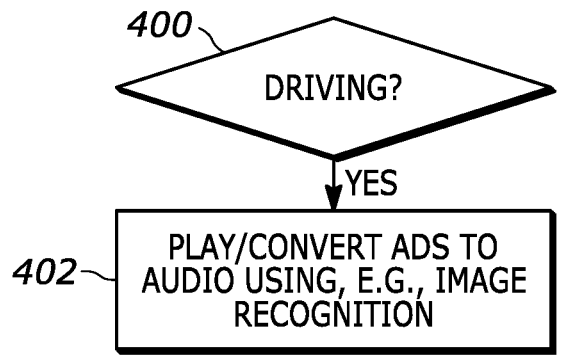
FIGS. 4 and 5 illustrate example use case logic in example flow chart format consistent with present principles.

FIG. 4 illustrates an example use case. If the user activity context is determined at decision diamond 400 to be an audio context such as driving as may be indicated by a user speed above a threshold as indicated by, e.g., signals from an IMU, the logic moves to block 402 to present an advertisement in primarily or exclusively audio format. This may be done by converting a standard advertisement with both audio and video components into audio only by executing image recognition on the video portion of the advertisement to derive terms describing the video and playing audio of the terms on the speakers 216.

Figure 5:
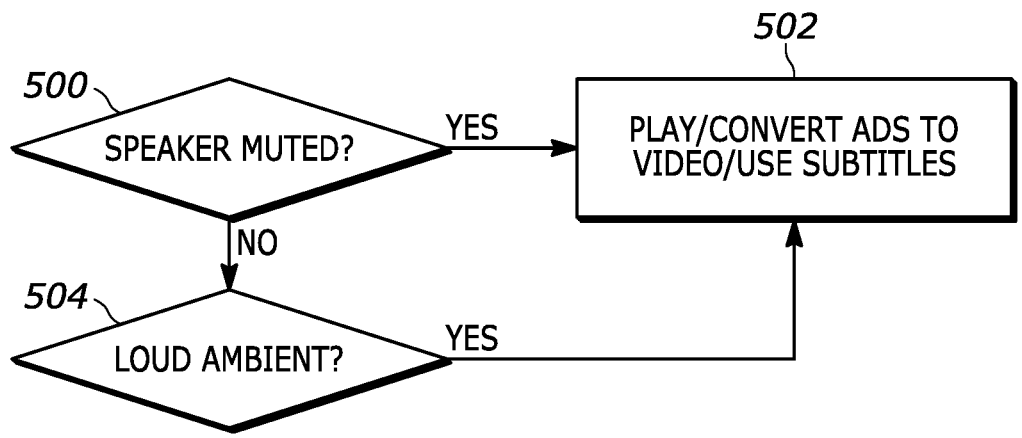

FIG. 5 illustrates another use case in which if it is determined that if the speaker 216 in FIG. 2 is muted at decision diamond 500, indicating a visual context, a primarily or exclusively video advertisement is presented at block 502. Likewise, if it is determined at decision diamond 504 using signals from the microphone 204 in FIG. 2 that the ambient noise in the location of the user device is high, indicating visual mode, the logic can move to block 502 to play a primarily or exclusively video advertisement.

Figure 6:
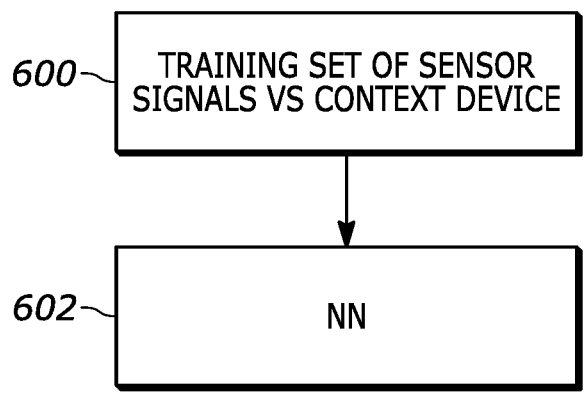
FIG. 6 illustrates example logic in example flow chart format for training on context consistent with present principles.

FIG. 6 illustrates a simplified technique for training a NN that may be executed by the processor to present advertisements based on context. A training set of input signals such as sensor and device signals and combinations of such signals versus corresponding ground truth context may be input to the NN 602 to train the NN 602 to learn how to identify context based on the input signals.

Figure 7:
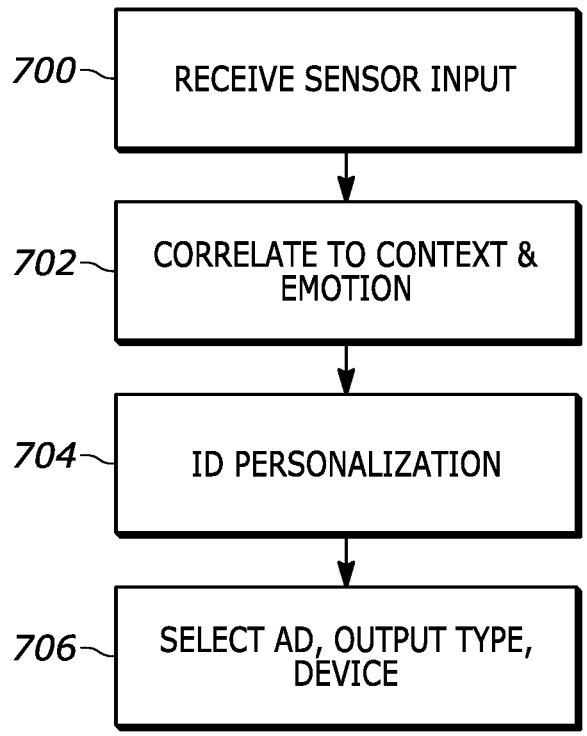
FIG. 7 illustrates example logic in example flow chart format consistent with present principles.

FIG. 7 illustrates additional logic. Commencing at block 700 sensor input signals are received. Moving to block 702 the signals are correlated to context, which may include an emotion. In one embodiment the techniques described in the present assignee's co-pending U.S. patent application Ser. No. 16/383,896, incorporated herein by reference, may be used, in which image recognition, audio input, and text input are used to infer the emotional state.

Moving to block 704, advertisements may be personalized to the user using one or more of the physical activity context, the emotional state of the user, and a user profile that may include demographics of a user. As but one example, a young user whose emotional state is depressed and who is driving (indicating an audio context) may be presented with an audio-based advertisement for an enjoyable entertainment establishment catering to young people, presented with an upbeat rhythm. As another example, an older user whose emotional state is relaxed in a context indicating walking on a busy street or other visual context may be presented with a primarily visual advertisement of a vacation resort.

Block 706 indicates that based on the personalization at block 704, an advertisement is selected and output in the appropriate context mode, i.e., audio or visual.

Figure 8:
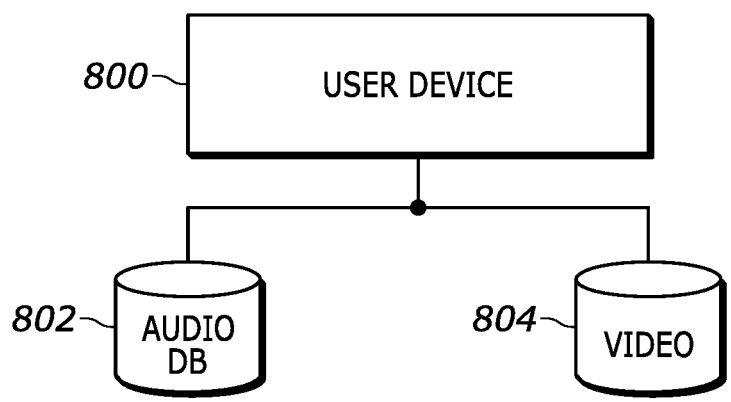
FIG. 8 illustrates a user device switching between sources of advertisements depending on context.

FIG. 8 illustrates an alternate technique in which a user device 800, in response to identifying an audio context, accesses advertisements in a first database 802, which contains audio-based advertisements that may be personalized to emotion and demographics of an accessing user. In this way the user device is assured of accessing only advertisements suitable to an audio context. On the other hand, the user device 800, in response to identifying a visual context, may access advertisements in a second database 804, which contains video-based advertisements that may be personalized to emotion and demographics of an accessing user. In this way the user device is assured of accessing only advertisements suitable to a visual context.

Figure 9:
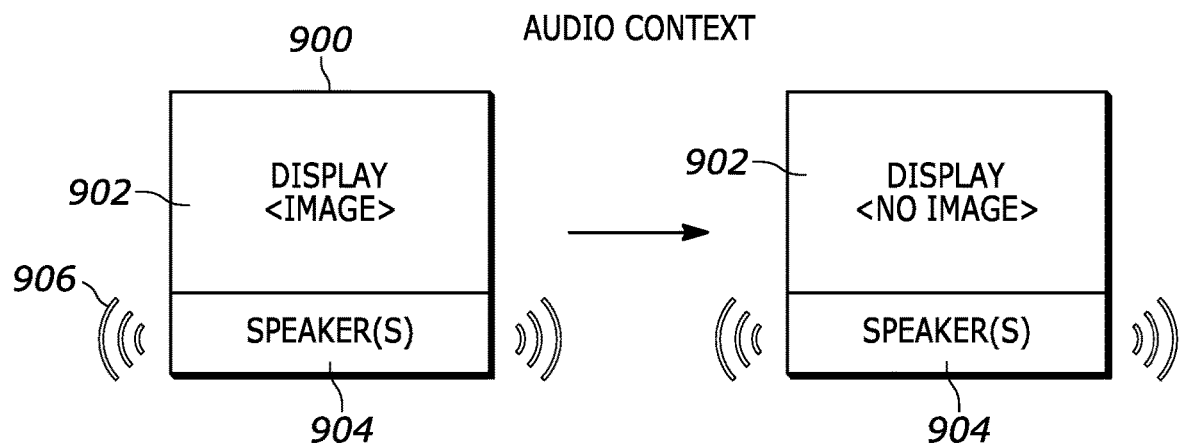
FIG. 9 illustrates transitioning from normal context to audio context.

FIG. 9 provides further illustration. A user device 900 may include one or more video displays 902 and one or more audio speakers 904. Under a "normal" context that would not preclude presentations of audio or video, an advertisement image can be presented on the display 902 and accompanying advertisement audio can be presented on the speakers 904, as indicated by the symbols 906.

However, should the context change to audio context as indicated by the arrow pointing to the right in FIG. 9, an advertisement may be presented on the user device 900 by presenting no image on the display 902 and by presenting audio on the speakers 904. For example, the same advertisement that is presented as presented in the left portion of FIG. 9 may be presented on the right portion of FIG. 9 except that the video part of the advertisement is not presented and the underlying audio is presented on the speakers along with, if desired, enhanced audio describing the video portion of the advertisement. Or, a different, audio-only advertisement may be presented in the audio context for the same product as the original advertisement was concerned with in the normal context in which both audio and video are appropriate to be presented. Or, a different, audio-based advertisement may be presented for an entirely different product.

Figure 10:
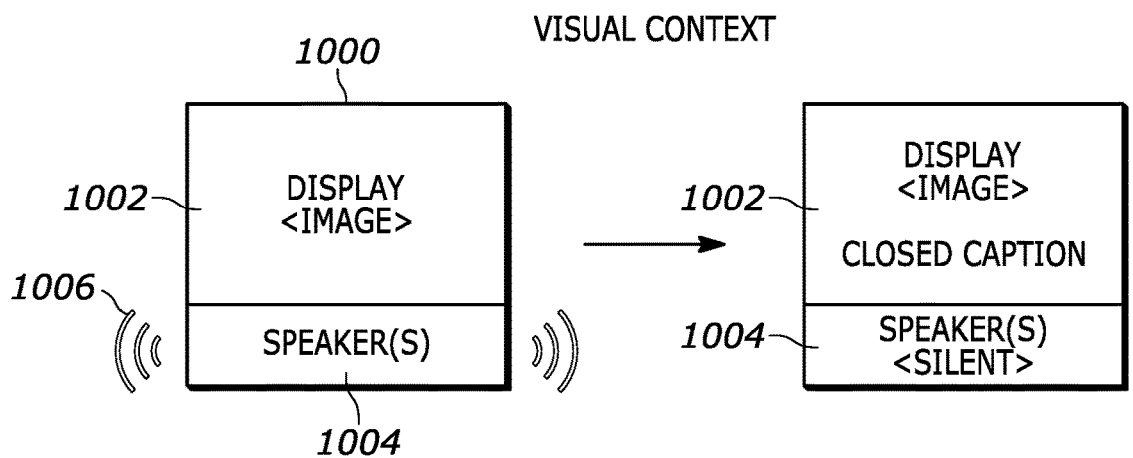
FIG. 10 illustrates transitioning from normal context to visual context.

FIG. 10 provides still further illustration. A user device 1000 may include one or more video displays 1002 and one or more audio speakers 1004. Under a "normal" context that would not preclude presentations of audio or video, an advertisement image can be presented on the display 1002 and accompanying advertisement audio can be presented on the speakers 1004, as indicated by the symbols 1006.

However, should the context change to visual context as indicated by the arrow pointing to the right in FIG. 10, an advertisement may be presented on the user device 1000 by presenting an image on the display 1002 and by presenting no audio on the speakers 1004. For example, the same advertisement that is presented as presented in the left portion of FIG. 10 may be presented on the right portion of FIG. 10 except that the audio part of the advertisement is not presented and the underlying video is presented on the display 1002 along with, if desired, enhanced video such as closed captioning describing the audio portion of the advertisement. In such a case, closed captioning, if disabled on the user device, may be automatically enabled responsive to detecting a visual context. Or, a different, video-only advertisement may be presented in the visual context for the same product as the original advertisement was concerned with in the normal context in which both audio and video are appropriate to be presented. Or, a different, video-based advertisement may be presented for an entirely different product.

While particular techniques and machines are herein shown and described in detail, it is to be understood that the subject matter which is encompassed by the present invention is limited only by the claims.

What is claimed is:

1. An apparatus comprising:
   at least one processor programmed with instructions which are executable by the at least one processor to:
   receive signals from at least one sensor associated with a user device;
   based at least in part on the signals, identify a context;
   based on the context being audio, present a modified advertisement of an original advertisement on at least one display of the user device, the modified advertisement having some content in visual format but less content in visual format than the original ad; and
   based on the context being visual, play a visual advertisement on at least one video display of the user device.

2. The apparatus of claim 1, wherein the instructions are executable to:
   based on the context being visual, present on the display text representing audio in the ad.

3. The apparatus of claim 2, wherein the instructions are executable to:
   based on the context being visual, automatically enable closed captioning presentation on the user device.

4. The apparatus of claim 1, wherein the context is identified as being video by identifying that at least one audio speaker is muted without respect to ambient noise.

5. The apparatus of claim 1, wherein the at least one sensor comprises a location sensor.

6. The apparatus of claim 1, wherein the at least one sensor comprises a microphone.

7. The apparatus of claim 1, wherein the at least one sensor comprises a camera.

8. The apparatus of claim 1, wherein the at least one sensor comprises an inertial measurement unit (IMU).

9. The apparatus of claim 1, wherein the instructions are executable to:
   select an advertisement from a first source of ads responsive to the context being audio; and
   select an advertisement from a second source of ads responsive to the context being visual.

10. The apparatus of claim 1, wherein the instructions are executable to:
    execute image recognition on a first ad;
    use the image recognition to generate audio based on terms derived from the image recognition; and
    use the audio to generate an audio version of the first advertisement to be presented when the context is audio.

11. An assembly comprising:
    a processor programmed with instructions executable to configure the processor to:
    infer a user context based on signals from at least one sensor;
    responsive to a first user context, present an advertisement in a first format; and
    responsive to a second user context, present the advertisement in a second format, wherein the second user context is audio, and the instructions are executable to, responsive to the second context, present a modified advertisement of an original advertisement on at least one display of the user device, the modified advertisement having some visual information but less visual information than the original ad.

12. The assembly of claim 11, wherein the first format comprises a visual format.

13. The assembly of claim 11, wherein the at least one sensor comprises a location sensor.

14. The assembly of claim 11, wherein the at least one sensor comprises a microphone.

15. The assembly of claim 11, wherein the at least one sensor comprises a camera.

16. The assembly of claim 11, wherein the at least one sensor comprises an inertial measurement unit (IMU).

17. The assembly of claim 11, wherein the instructions are executable to:
    select an advertisement from a first source of ads responsive to the context being audio; and
    select an advertisement from a second source of ads responsive to the context being visual.

18. The assembly of claim 11, wherein the instructions are executable to:
    execute image recognition on a first ad;
    use the image recognition to generate audio based on terms derived from the image recognition; and
    use the audio to generate an audio version of the first advertisement to be presented when the context is audio.

19. The assembly of claim 11, wherein the instructions are executable to:
    execute audio recognition on a first ad;
    use the audio recognition to generate text based on the audio recognition; and
    use the text to generate a video version of the first advertisement to be presented when the context is video.

* * * * *